(12) United States Patent
Otani

(10) Patent No.: US 11,001,022 B2
(45) Date of Patent: May 11, 2021

(54) METHOD FOR MANUFACTURING MOTORCYCLE TIRE

(71) Applicant: Sumitomo Rubber Industries, Ltd., Kobe (JP)

(72) Inventor: Masafumi Otani, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 358 days.

(21) Appl. No.: 15/943,379

(22) Filed: Apr. 2, 2018

(65) Prior Publication Data

US 2018/0222140 A1    Aug. 9, 2018

Related U.S. Application Data

(62) Division of application No. 14/270,996, filed on May 6, 2014, now Pat. No. 9,962,891.

(30) Foreign Application Priority Data

May 20, 2013  (JP) .................................. 2013-106409

(51) Int. Cl.
  *B29D 30/16*  (2006.01)
  *B29D 30/24*  (2006.01)
  (Continued)

(52) U.S. Cl.
  CPC ......... *B29D 30/16* (2013.01); *B29D 30/1621* (2013.01); *B29D 30/1628* (2013.01);
  (Continued)

(58) Field of Classification Search
  CPC ........ B29D 30/08; B29D 30/10; B29D 30/12; B29D 30/14; B29D 30/16; B29D 30/1607;
  (Continued)

(56) References Cited

U.S. PATENT DOCUMENTS 2,814,331 A   11/1957  Vanzo et al.
4,146,415 A    3/1979  Caretta et al.
(Continued)

FOREIGN PATENT DOCUMENTS

GB    2 157 239 A   10/1985
JP    53-6379       1/1978
(Continued)

OTHER PUBLICATIONS

Takashi Tanaka, JP-2007076182-A, machine translation. (Year: 2007).*
(Continued)

*Primary Examiner* — Robert C Dye
*Assistant Examiner* — Sedef E Paquette
(74) *Attorney, Agent, or Firm* — Birch, Stewart, Kolasch & Birch, LLP

(57) ABSTRACT

A method for manufacturing a motorcycle tire comprises: building a raw tire main body, building a breaker, sticking the breaker, and building a band. The building of the breaker comprises: moving two cylindrical support rings to operating positions, swelling the raw tire main body to have its crown portion protruding from the support rings through a gap therebetween, and winding a breaker ply material on the support rings to form a cylindrical breaker ply whose inner surface is adhered to the raw tire main body. The sticking of the breaker comprises: expanding a profiled deck to swell the raw tire main body into a second swollen state, and turning down both edge portions of the breaker while being supported by the profiled deck. The building of the band comprises: spirally winding a tape on the curved breaker ply while being supported by the profiled deck.

9 Claims, 12 Drawing Sheets

(51) Int. Cl.
*B29D 30/70* (2006.01)
*B29D 30/36* (2006.01)
*B29D 30/26* (2006.01)

(52) U.S. Cl.
CPC ........... *B29D 30/242* (2013.01); *B29D 30/70* (2013.01); *B29D 30/36* (2013.01); *B29D 2030/2664* (2013.01)

(58) Field of Classification Search
CPC ............ B29D 30/1621; B29D 30/1628; B29D 30/22; B29D 30/24; B29D 30/242; B29D 30/246; B29D 30/3007; B29D 30/3021; B29D 30/3028; B29D 30/36; B29D 30/42; B29D 30/58; B29D 30/70; B29D 2030/2657; B29D 2030/2664
USPC .................................................. 156/117, 129
See application file for complete search history.

(56) References Cited

U.S. PATENT DOCUMENTS 4,528,052 A * 7/1985 Yoshie ................... B29D 30/70
156/117

2001/0039993 A1* 11/2001 Omokawa .............. B29D 30/20
156/132
2004/0159382 A1 8/2004 Armellin et al.
2009/0159164 A1* 6/2009 Ishiyama .................. B60C 9/18
152/157

FOREIGN PATENT DOCUMENTS

| JP | 56-161141 A | | 12/1981 |
|---|---|---|---|
| JP | 57-116630 A | | 7/1982 |
| JP | 08-1819 A | | 1/1996 |
| JP | 2003-118011 A | | 4/2003 |
| JP | 2007076182 A | * | 3/2007 |

OTHER PUBLICATIONS

English language Abstract for JP 57-116630 (original document dated Jul. 1982).
English language Abstract of JP 53/6379 (original document dated Jan. 1978).
English translation of JP 56-161141 (original document dated Dec. 1981).
Machine generated English language translation of JP 2003-118011 (original document dated Apr. 2003).

* cited by examiner

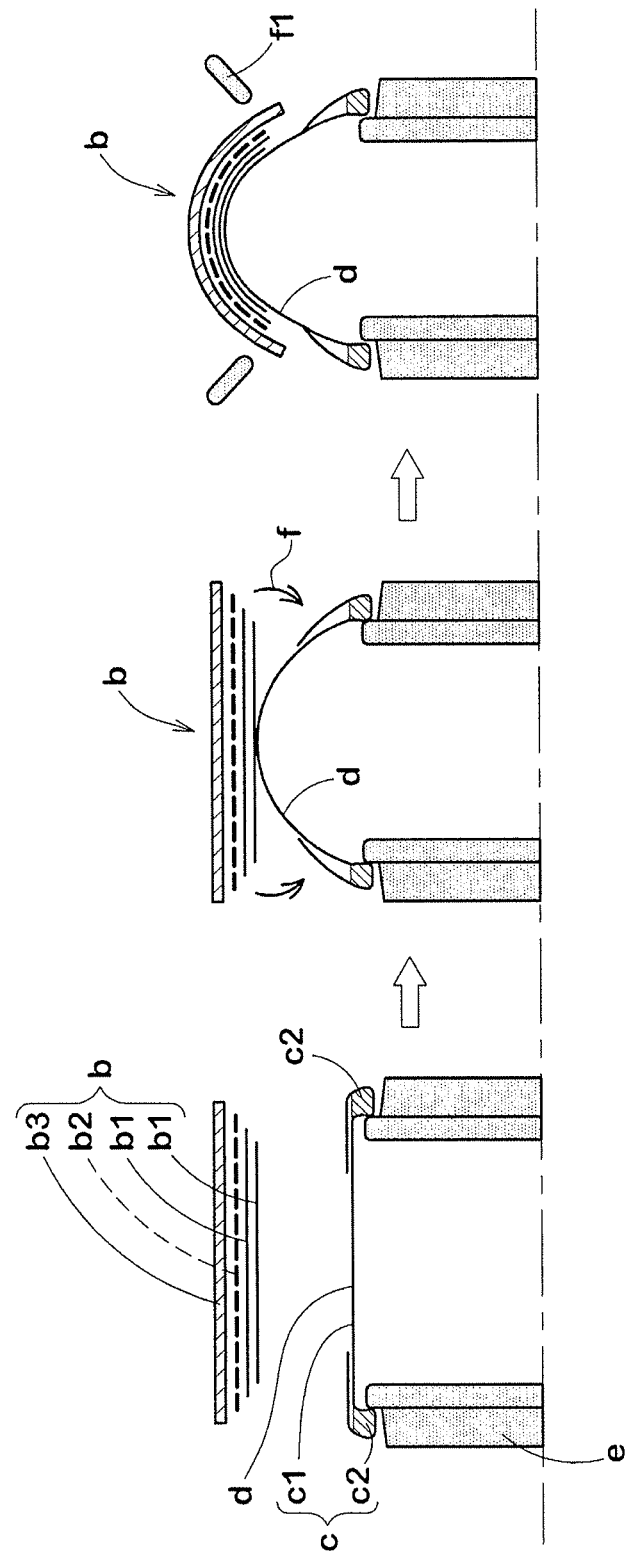

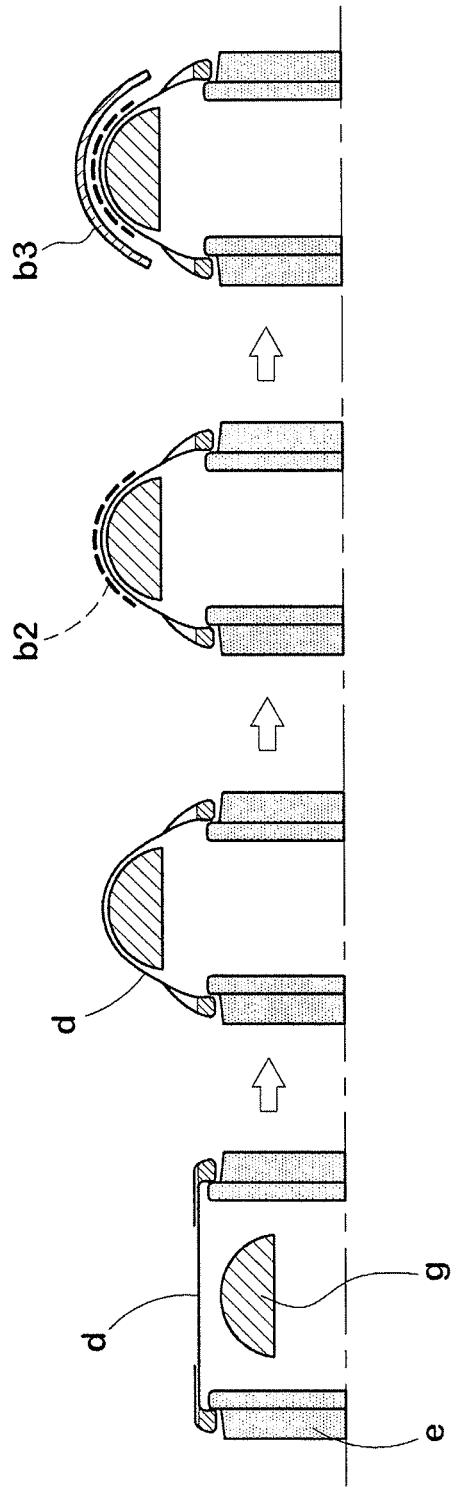

METHOD FOR MANUFACTURING MOTORCYCLE TIRE

CROSS-REFERENCE TO RELATED APPLICATIONS

This application is a Divisional of copending U.S. application Ser. No. 14/270,996, filed on May 6, 2014, which claims the benefit under 35 U.S.C. § 119(a) to Patent Application No. 2013-106409, filed in Japan on May 20, 2013, all of which are hereby expressly incorporated by reference into the present application.

BACKGROUND OF THE INVENTION

The present invention relates to a method for manufacturing a motorcycle tire provided in the tread portion with a breaker and a band, more particularly to a method for building a raw tire by the use of breaker support rings capable of improving the uniformity of the tire.

In a method for manufacturing a pneumatic tire for four-wheeled vehicles, a widely employed process for building a raw tire is as follows.

As shown in FIG. 11, a carcass ply c1 is wound into a cylindrical shape on a carcass building drum (not shown) and bead cores c2 are fitted on the cylindrical carcass c to form a cylindrical raw tire main body d. On the other hand, breaker plies b1, a band ply b2 and a tread rubber b3 are wound on a tread building drum (not shown) to form a cylindrical tread assembly b separately from the raw tire main body d. Then, by the use of a shaping drum e, the cylindrical raw tire main body d is swollen or shaped into a toroidal form by the use of an inflatable bladder for pressurizing the inside of the raw tire so that the crown portion of the swollen raw tire main body d adheres to the tread assembly b waiting on the radially outside of the raw tire main body d. Further, both edge portions of the cylindrical tread assembly b are turned down onto the toroidal raw tire main body d by the use of pressure rollers f1 so that the entirety of the tread assembly b adheres to the raw tire main body d.

In a motorcycle tire whose tread portion has a relatively small radius of curvature when compared with the passenger car tires, truck/bus tires and the like, the radius of curvature of the crown portion of the toroidal raw tire main body d is also relatively small. Therefore, if the above-mentioned manufacturing method is employed, when the edge portions of the cylindrical tread assembly are turned down onto the toroidal raw tire main body, the breaker cord arrangement and the band cord arrangement are liable to be disturbed. In particular, since the band cord angle with respect to the tire circumferential direction is small, the band is liable to cause undulation when pressed. Thus, the band is liable to exert a bad influence on the tire uniformity than the breaker whose cord angles are relatively small and cord lengths are relatively short.

Thus, it is difficult to improve the uniformity of a motorcycle tire provided with a breaker and a band.

SUMMARY OF THE INVENTION

It is therefore, an object of the present invention to provide a method for manufacturing a motorcycle tire with a breaker and a band, by which the tire uniformity can be effectively improved by preventing the occurrence of disarrangement or undulation of the breaker cords and band cord.

According to a first invention, a motorcycle tire to be manufactured comprises a tread portion, a pair of sidewall portions, a pair of bead portions each with a bead core therein, a carcass extending between the bead portions through the tread portion and the sidewall portions, a breaker disposed radially outside the carcass in the tread portion and composed of two or three plies of cords laid at angles of from 10 to 40 degrees with respect to the tire circumferential direction, and a band disposed radially outside the breaker in the tread portion and composed of at least one ply of at least one cord wound spirally and circumferentially of the tire, and a method for manufacturing such motorcycle tire comprises a raw tire main body building process for building a cylindrical raw tire main body comprising a cylindrical carcass formed by winding a strip of carcass ply material into a cylindrical shape, and the bead cores disposed in both end portions of the cylindrical carcass, a breaker building process for building a cylindrical breaker ply by winding a strip of breaker ply material into a cylindrical shape, a sticking process for applying both edge portions of the cylindrical breaker ply to the raw tire main body swollen into a toroidal shape by turning down the edge portions, a band building process for building a band ply on the breaker ply by spirally circumferentially winding a tape for forming the band ply thereon, wherein the breaker building process comprises a support ring closing step in which a pair of support rings each having a cylindrical outer surface are moved from their axially outer standby positions to their axially inner operating positions, wherein the support rings are disposed one on each side of an axial center corresponding to the tire equatorial plane, and supported movably in the axial direction so as to come close to each other or get away from each other, a first swelling step in which the raw tire main body is swollen into a toroidal shape, while decreasing the distance between the bead cores, so as to become a first swollen state in which a crown portion of the swollen raw tire main body protrudes slightly radially outwardly from the cylindrical outer surfaces of the support rings through a gap therebetween, and a winding step in which a strip of the breaker ply material is wound on the support rings to extend across the gap, whereby a cylindrical breaker ply whose inner circumferential surface is adhered to the protruding crown portion of the raw tire main body is formed, the sticking process comprises a second swelling step in which, after the support rings are moved to the standby positions, a profiled deck is expanded from its contracted state to its expanded state, while decreasing the distance between the bead cores, so that the raw tire main body with the cylindrical breaker ply thereon is swollen to a second swollen state, and the inside thereof is supported by the profiled deck, and a turn-down step in which, in the state of the raw tire main body supported by the profiled deck, both edge portions of the cylindrical breaker ply are turned down onto the raw tire main body so as to shape the cylindrical breaker ply into a curved breaker ply curved along the outer circumferential surface of the profiled deck, and the band building process comprises a tape winding step in which the tape is spirally wound on the outer circumferential surface of the curved breaker ply in the state supported by the profiled deck so that the band ply is formed along the outer circumferential surface of the profiled deck.

Therefore, in the first invention, a strip of breaker ply material is wound on the cylindrical outer surfaces of the support rings, therefore, the centering of the breaker ply material can be made easily and accurately in the breaker building process. At this moment, the crown portion of the swollen raw tire main body slightly protrudes from the support rings through the gap therebetween, therefore, the central portion of the breaker ply is adhered to the protruding part of the raw tire main body. This prevents displacement of the breaker ply relative to the raw tire main body.

In the sticking process, during supported by the profiled deck (namely, supported by a solid not a fluid pressure), both edge portions of the cylindrical breaker ply only (tread rubber and band are not included) are turned down, therefore, it is possible to turn down the edge portions with high accuracy. Further, the turning down operation is carried out in the second swollen state in which the radius of curvature of the crown portion of the raw tire main body is larger than that in the first swollen state, therefore, the amount of turning down of the edge portions is decreased.

As a result, the occurrence of disarrangement or undulation of the breaker cords can be more effectively suppressed. Further, the occurrence of disarrangement or undulation of the band cord can be prevented since a tape for forming the band is spirally wound directly on the breaker in the state supported by the profiled deck.

According to a second invention, a motorcycle tire to be manufactured comprises a tread portion, a pair of sidewall portions, a pair of bead portions each with a bead core therein, a carcass extending between the bead portions through the tread portion and the sidewall portions, a band disposed radially outside the carcass in the tread portion and composed of at least one ply of at least one cord wound spirally and circumferentially of the tire, and a breaker disposed radially outside the band in the tread portion and composed of two or three plies of cords laid at angles of from 10 to 40 degrees with respect to the tire circumferential direction, and a method for manufacturing such motorcycle tire comprises

- a raw tire main body building process for building a cylindrical raw tire main body comprising a cylindrical carcass formed by winding a strip of carcass ply material into a cylindrical shape, and the bead cores disposed in both end portions of the cylindrical carcass,
- a band building process for building a band ply by spirally circumferentially winding a tape for forming the band ply on the raw tire main body swollen into a toroidal shape,
- a breaker building process for building a cylindrical breaker ply by winding a strip of breaker ply material into a cylindrical shape,
- a sticking process for applying both edge portions of the cylindrical breaker ply to the band ply on the swollen raw tire main body by turning down the edge portions, wherein the band building process comprises a second swelling step in which, while decreasing the distance between the bead cores, a profiled deck is expanded from its contracted state to its expanded state so that the raw tire main body is swollen into a second swollen state, and the inside thereof is supported by the profiled deck, and a tape winding step in which, in the state of the raw tire main body supported by the profiled deck, the tape is spirally wound on the outer circumferential surface of the swollen raw tire main body so that the band ply is formed along the outer circumferential surface of the profiled deck, the breaker building process comprises a support ring closing step in which a pair of support rings each having a cylindrical outer surface are moved from their axially outer standby positions to their axially inner operating positions so that the crown portion of the band ply slightly protrudes from the cylindrical outer surfaces of the support rings through a gap therebetween, wherein the support rings are disposed one on each side of an axial center corresponding to the tire equatorial plane, and supported movably in the axial direction so as to come close to each other or get away from each other, and a winding step in which a strip of the breaker ply material is wound on the support rings to extend across the gap, whereby a cylindrical breaker ply whose inner circumferential surface is adhered to the protruding crown portion of the band ply is formed, and the sticking process comprises a turn-down step in which, after the support rings are moved to the standby positions, both edge portions of the cylindrical breaker ply are turned down in the state of the raw tire main body supported by the profiled deck so as to shape the cylindrical breaker ply into a curved breaker ply curved along the outer circumferential surface of the profiled deck.

Therefore, in the second invention, the occurrence of disarrangement or undulation of the band cord can be prevented since a tape for forming the band is spirally wound directly on the raw tire main body in the state supported by the profiled deck. In the breaker building process, a strip of breaker ply material is wound on the cylindrical outer surfaces of the support rings, therefore, the centering of the breaker ply material can be made easily and accurately. At this moment, the crown portion of the band wound on the raw tire main body slightly protrudes from the support rings through the gap therebetween, therefore, the central portion of the breaker ply is adhered to the protruding part of the bad. This prevents displacement of the breaker ply relative to the band.

In the sticking process, during supported by the profiled deck (namely, supported by a solid not a fluid pressure), both edge portions of the cylindrical breaker ply only (tread rubber and band are not included) are turned down, therefore, it is possible to turn down the edge portions with high accuracy.

BRIEF DESCRIPTION OF THE DRAWINGS

FIG. 11 is a schematic diagram for explaining the conventional raw tire building process in the second invention.

FIG. 12 is a schematic diagram for explaining the raw tire building process in the patent document 1.

DESCRIPTION OF THE PREFERRED EMBODIMENTS

Embodiments of present invention will now be described in detail in conjunction with accompanying drawings.

Figure 1:
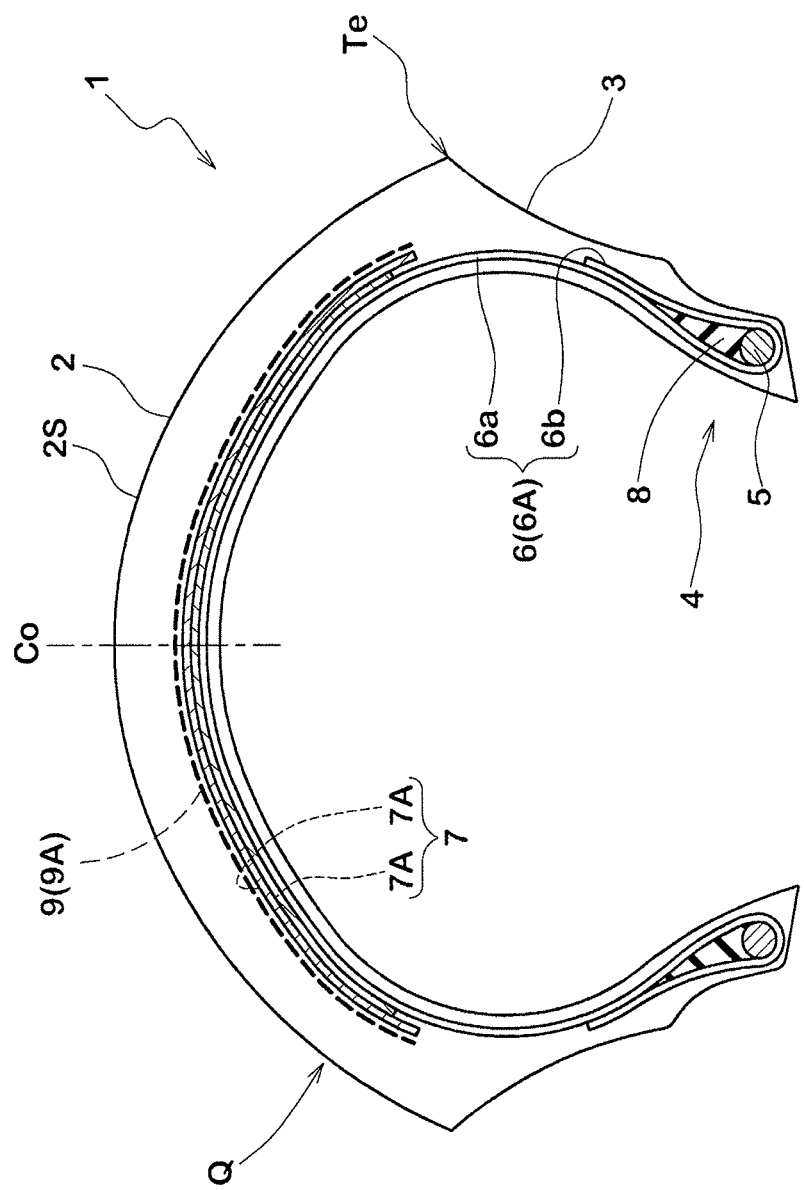
FIG. 1 is a cross sectional view of a motorcycle tire manufactured by a manufacturing method according to a first invention.

As shown in FIG. 1, a motorcycle tire 1 manufactured by a method according to the first invention comprises a tread portion 2, a pair of sidewall portions 3, a pair of bead portions 4 each with a bead core 5 therein, a carcass 6 extending between the bead portions 4 through the tread portion 2 and the sidewall portions 3, a breaker 7 disposed radially outside the carcass 6 in the tread portion 2, and a band 9 disposed radially outside the breaker 7 in the tread portion 2.

As a characteristic of a motorcycle tire, the tread portion 2 is convexly curved so that the tread face 2S between the tread edges Te is curved like an arc swelling radially outwardly, and the maximum cross sectional width of the tire occurs between the tread edges Te, namely, equals to the axial tread width.

The carcass 6 is composed of at least one ply 6A, in this example only one ply 6A of carcass cords arranged radially at an angle of from 65 to 90 degrees with respect to the tire circumferential direction for example.
Organic fiber cords, e.g. nylon, polyester, rayon and the like are suitably used as the carcass cords.
The carcass ply 6A extends between the bead portions 4 through the tread portion 2 and the sidewall portions 3, and is turned up around the bead core 5 in each bead portion 4 from the axially inside to the axially outside of the tire to be secured to the bead cores 5 and so as to form a pair of turned up portions 6b and a main portion 6a therebetween.

Between the main portion 6a and each turned up portion 6b, a bead apex rubber 8 for reinforcing the bead portion is disposed so as to extend radially outwardly from the bead core 5 in a tapered manner.

The breaker 7 is composed of two or three, in this example two plies 7A of breaker cords laid parallel each other at an angle of from 10 to 40 degrees with respect to the tire circumferential direction so that the cords in each ply 7A cross those in the next ply.
Organic fiber cords such as aramid, nylon, rayon and the like can be suitably used for the breaker cords. Especially, aramid fiber cords are preferred. It is however, also possible to use steel cords.

The band 9 is composed of one or more, in this example only one ply 9A of at least one spirally-wound band cord. such band 9 is provided to prevent the tread portion 2 from being lifted due to high speed rotations and increase the circumferential rigidity of the tread portion 2. Thereby, the durability and steering stability during high speed running can be improved.

First invention of a method for manufacturing the motorcycle tire 1 will be described in detail below.

The manufacturing method comprises a process for building a raw tire (raw tire building process), and a process for vulcanization-molding the raw tire to make the motorcycle tire 1 (vulcanization-molding process).

The raw tire building process includes a raw tire main body building process S1a, a breaker building process S1b, a sticking process S1c, and a band building process S1d.

Figure 2:
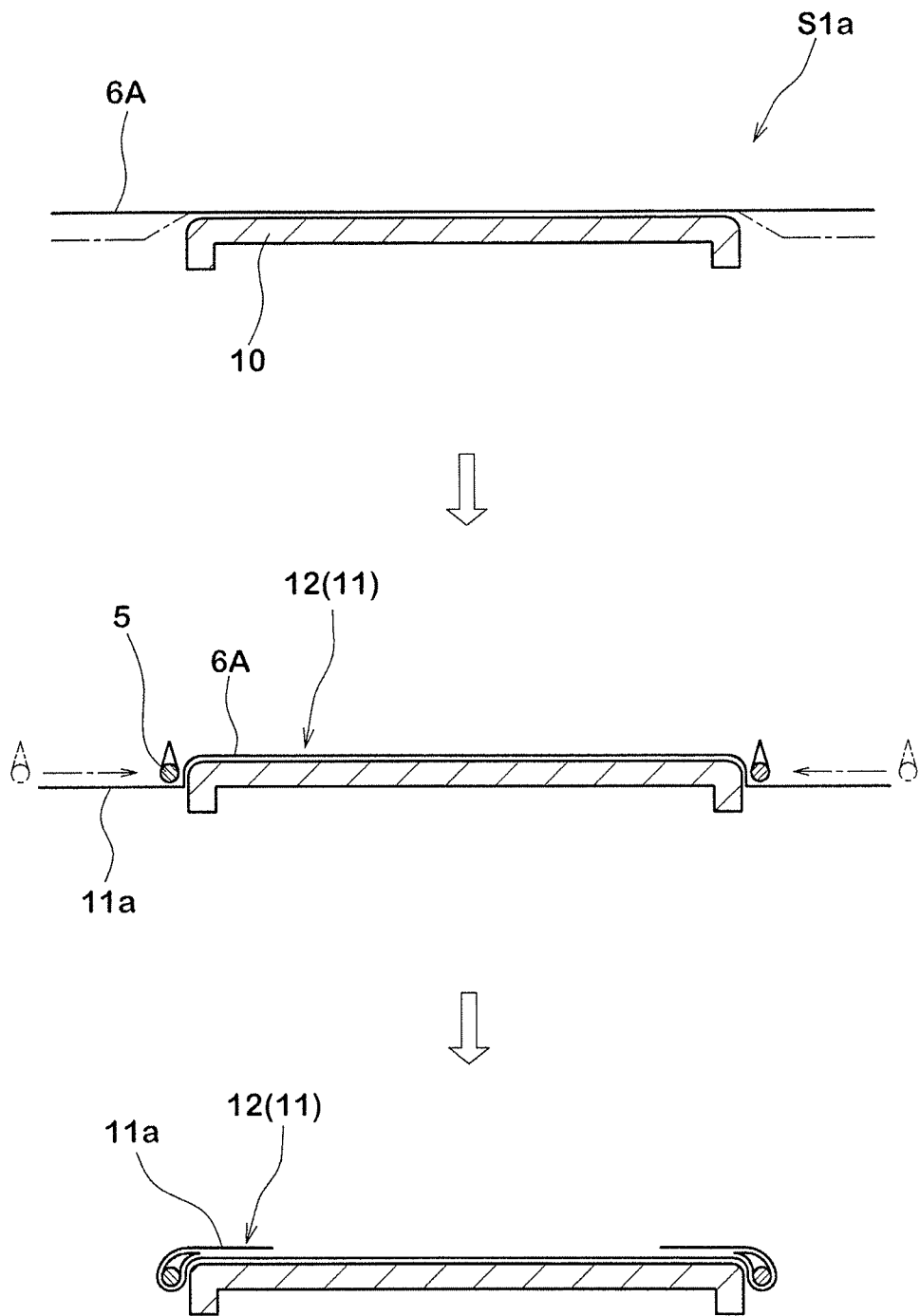
FIG. 2 is a schematic diagram for explaining the raw tire main body building process in the first invention.

The raw tire main body building process S1a is such that: a strip of the carcass ply 6A is circumferentially wound on a cylindrical surface of a building drum 10 as shown in FIG. 2A; the bead cores 5 are set as shown in FIG. 2B; and then both edge portions of the carcass ply strip are folded around the bead cores 5 as shown in FIG. 2C, whereby a cylindrical raw tire main body 12 including the cylindrical carcass 11 is formed. In this illustrated example, for example, an inner liner rubber, sidewall rubber, bead (clinch) rubber and the like are not shown. But, such tire construction members disposed along the cylindrical carcass 11 may be further included in the raw tire main body 12.

Figure 3:
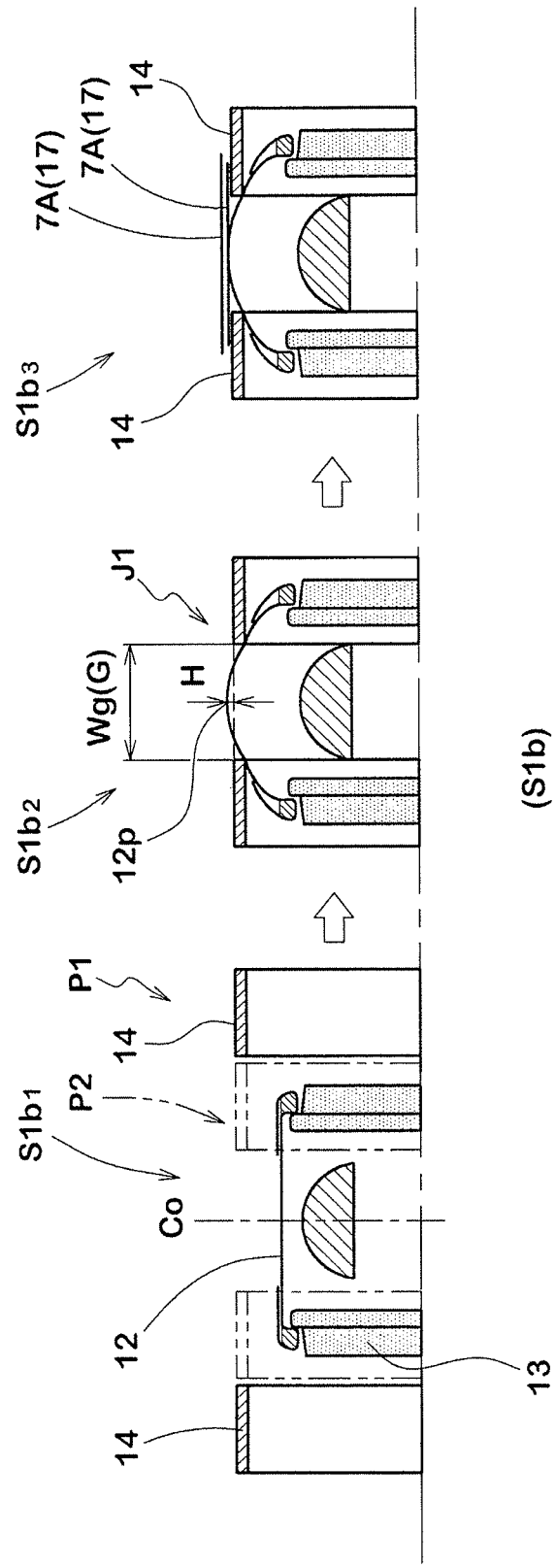
FIG. 3 is a schematic diagram for explaining the breaker building process in the first invention.

The raw tire main body 12 is removed from the building drum 10 by contracting the building drum 10.
The removed raw tire main body 12 is transferred to a shaping drum 13 as shown in FIG. 3.
Then, the breaker building process S1b, the sticking process S1c, and the band building process S1d are carried out in series.

In the breaker building process S1b, by winding a strip of the breaker ply 7A into a cylindrical shape, a cylindrical breaker ply 17 is formed.

As shown in FIG. 3, the breaker building process S1b includes a support ring closing step S1b1, a first swelling step S1b2 and a winding step S1b3, and uses a pair of cylindrical support rings 14 which are concentric with the shaping drum 13, and which are disposed one on each side of an axial center of the shaping drum 13 corresponding to the tire equatorial plane Co, and which are supported movably in the axial direction so as to come close to each other or get away from each other.

In the support ring closing step S1b1, the support rings 14 are respectively moved from their axially outer standby positions P1 to their axially inner operate positions P2.
At the operate positions P2, a gap G is formed between the support rings 14, and the axial width wg of the gap G is preferably set in a range of 50 to 100 mm.

In the first swelling step S1b2, the inside of the raw tire main body 12 is pressured, while decreasing the distance between the bead cores 5, so that the raw tire main body 12 is transformed from a cylindrical shape to a toroidal shape and becomes a first swollen state J1 in which the crown portion 12p of the raw tire main body 12 protrudes radially outwardly from the outer surfaces of the support rings through the gap G by a small protruding amount H which is preferably in a range of 5 to 30 mm.

In the winding step S1b3, a strip of the breaker ply 7A is wound on the outer surfaces of the support rings 14 so as to extend across the gap G. Thereby, the cylindrical breaker ply 17 whose inner surface is adhered to the crown portion of the raw tire main body 12 is formed.

In the next sticking process sic, the edge portions of the cylindrical breaker ply 17 are turned down and adhered to the toroidal raw tire main body 12.

Figure 4:
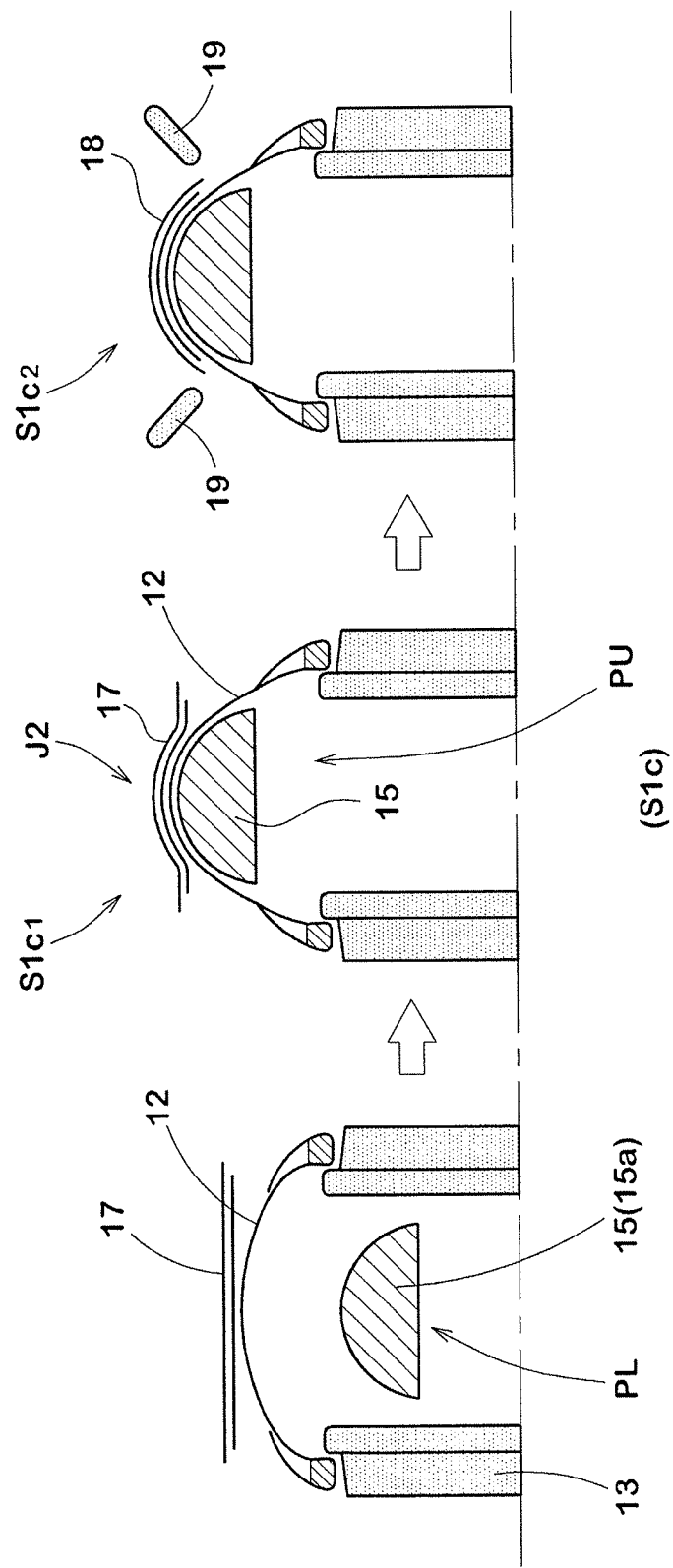
FIG. 4 is a schematic diagram for explaining the sticking process in the first invention.

As shown in FIG. 4, the sticking process S1c comprises a second swelling step S1c1, and a turn-down step S1c2, and uses a profiled deck 15 which is concentric with the shaping drum 13 which is able to contract and expand which has, in the expanded state, an outer surface whose profile is similar to that of the inner surface of the finished tire 1.

The profiled deck 15 is composed of a plurality of circumferentially divided segments 15a each of which is radially inwardly or outwardly movable by an actuator, e.g. linkage mechanism, cylinder actuator or the like (not shown).

In the second swelling step S1c1, after the support rings 14 are moved to the respective standby positions P1, the profiled deck 15 is expanded from the contracted state in which the segments 15a are at their radially inner standby positions PL to the expanded state in which the segments 15a are at their radially outer operating positions PU, while further decreasing the distance between the bead cores 5 so that the raw tire main body 12 is, together with the cylindrical breaker ply 17, swollen to the second swollen state J2 from the above-mentioned first swollen state J1.

The above-mentioned turn-down step S1c2 is such that, in the state of the cylindrical breaker ply 17 whose inside is supported by the profiled deck 15, both edge portions of the cylindrical breaker ply 17 are turned down toward the toroidal raw tire main body 12 so that the cylindrical breaker ply 17 is shaped into a curved breaker ply 18 curved along the profiled outer surface of the profiled deck 15.

The turn-down operation can be achieved by pressing pressure rollers 19 against the breaker ply 17 while rotating the shaping drum 13 together with the breaker ply 17 thereon.

Figure 5:
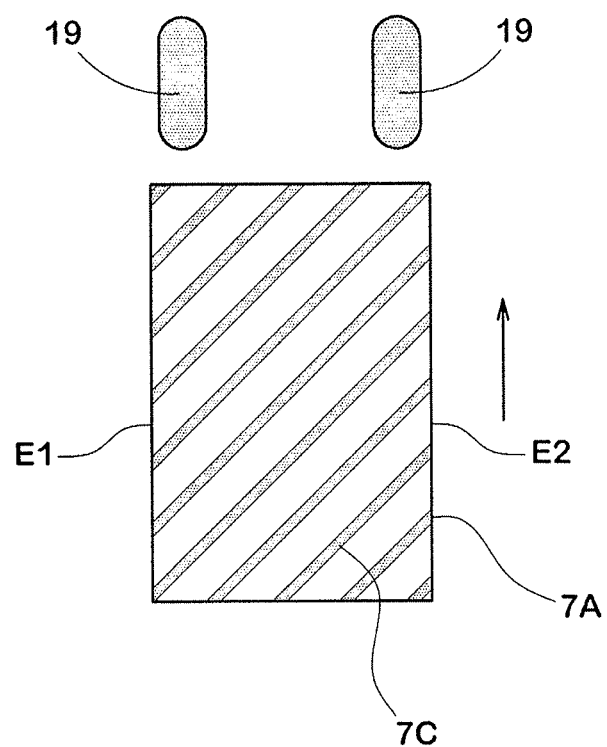
FIG. 5 is a schematic diagram for explaining the turn-down step in the first invention.

The cords 7C of the breaker ply 7A contacting with the pressure rollers 19 are inclined as shown in FIG. 5. Therefore, when the breaker ply 7A is rotated in one direction, there is a tendency that one of the pressure rollers 19 (right-hand roller in FIG. 5) pushes some of the cords 7C whereas the other roller 19 (left-hand roller in FIG. 5) pulls some of the cords 7C. The pulled cords have a less tendency to disturb the cord arrangement whereas the pushed cords tend to disturb the cord arrangement and cause undulation in the finished breaker ply 7A. In view of this, it is preferable that the turned-down operation is carried out in such direction that the cords are pulled. In FIG. 5, this means that on one side E1, the turned-down operation is made while rotating the breaker ply 7A in the arrowed line direction, and on the side E2, the turned-down operation is made while rotating the breaker ply 7A in the reverse direction, namely, the turned-down operation is made one after the other.

Figure 6:
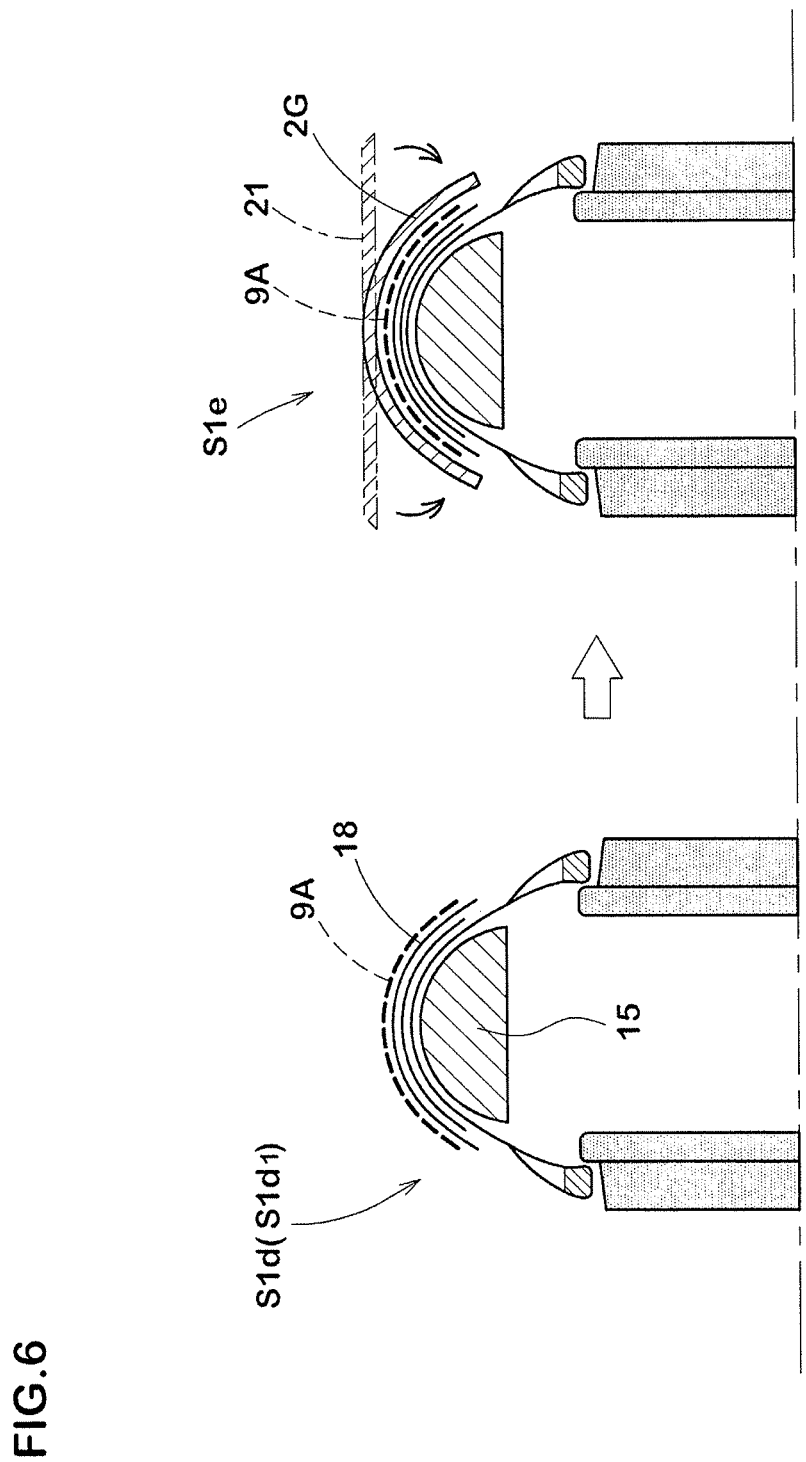
FIG. 6 is a schematic diagram for explaining the band building process and tread rubber building process in the first invention.

The band building process S1d includes a tape winding step S1d1 in which a tape for forming the band ply is spirally wound on the outer surface of the curved breaker ply 18 whose inside is supported by the profiled deck 15 as shown in FIG. 6. Thereby, the band ply 9A is formed along the profiled outer surface of the profiled deck 15 so as to have a jointless structure.

The tape is of an unvulcanized rubber in which one or more band cords are embedded along the longitudinal direction and has a width of from about 5 to 15 mm.

The raw tire building process further includes a tread building process S1e in which the tread rubber 2G is disposed on the band ply 9A.

In the tread building process S1e in this example, as shown in FIG. 6, a strip of a tread rubber member 21 extruded to have a trapezoidal sectional shape is used as the tread rubber 2G. The strip is circumferentially wound on the band ply 9A in a cylindrical form and then the edge portions are turned down onto the band ply 9A.

As another example of the tread building process S1e, the tread rubber 2G can be formed directly on the band ply 9A by spirally winding a narrow rubber tape (not shown) a number of times on the band ply 9A. (STW method)

In the first invention of the manufacturing method, the support rings 14 are used in the breaker building process S1b and a strip of the breaker ply 7A is wound on the cylindrical surface, therefore, the centering can be made easily and accurately.

When winding the strip, the crown portion 12p of the raw tire main body 12 slightly protrudes from the support rings 14 through the gap G therebetween, and a central part of the wound breaker ply 7A adheres to the crown portion of the raw tire main body 12, therefore, possible displacement in the subsequent process can be prevented.

If the axial width wg of the gap G is less than less than 50 mm or the protruding amount H of the crown portion 12p is less than 5 mm, then the adhesion between the breaker ply 7A and the raw tire main body 12 becomes insufficient. If the axial width wg is more than 100 mm or the protruding amount H is more than 30 mm, then there is a possibility that the precision of the winding of the strip becomes lowered.

If the cylindrical breaker ply 17 extending across the gap G is wound on the support rings 14 first and thereafter the raw tire main body 12 is swollen by pressurizing the inside, then there is a possibility that the positional accuracy between the raw tire main body 12 and the breaker ply 17 adhered thereto becomes lowered because the contact of the swelling raw tire main body 12 with the cylindrical breaker ply 17 tends to become unstable.

In the breaker building process S1b, therefore, the winding step S1b3 is carried out after the first swelling step S1b2.

In the above-mentioned sticking process S1c, in such a state that the inside of such assembly is supported by the profiled deck 15, both edge portions of the cylindrical breaker ply 17 are turned down.

Figure 7:
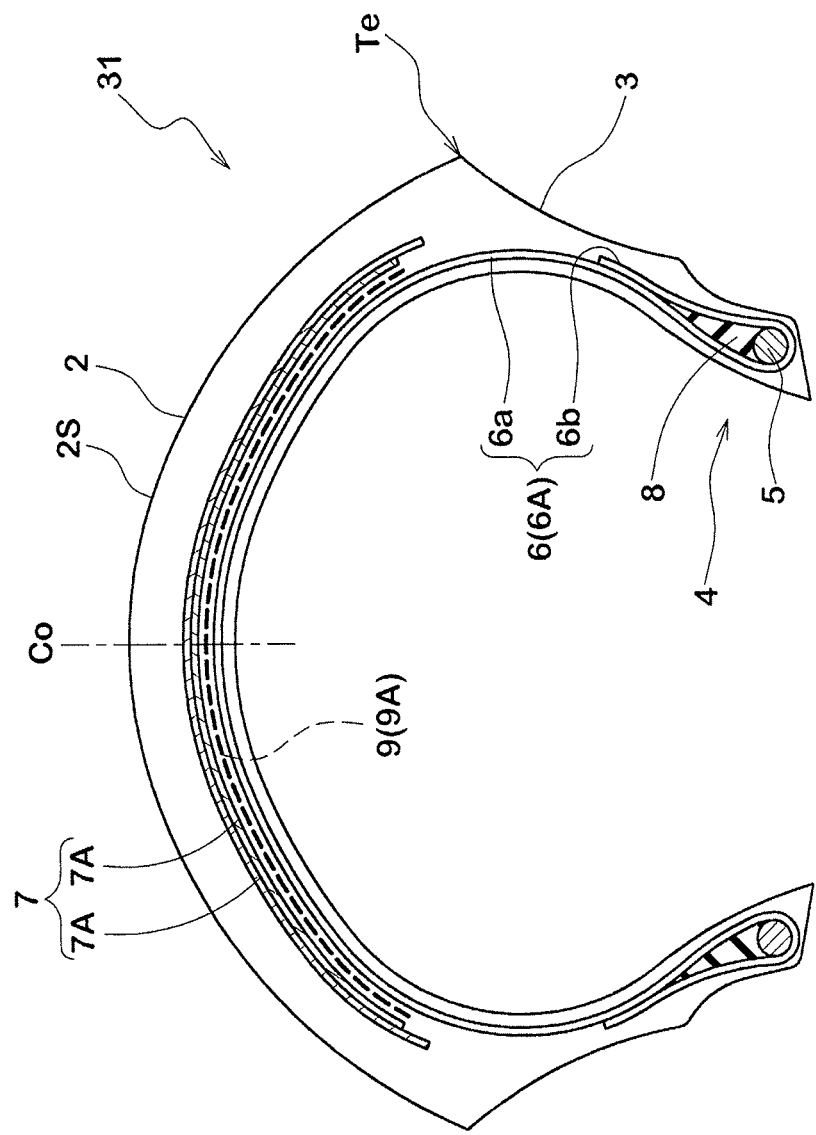
FIG. 7 is a cross sectional view of a motorcycle tire manufactured by a manufacturing method according to a second invention.

FIG. 7 shows a cross section of a motorcycle tire 31 manufactured by a second invention of the manufacturing method.

The motorcycle tire 31 comprises a tread portion 2, a pair of sidewall portions 3, a pair of bead portions 4 each with a bead core 5 therein, a carcass 6 extending between the bead portions 4 through the tread portion 2 and the sidewall portions 3, a band 9 disposed radially outside the carcass 6 in the tread portion 2, and a breaker 7 disposed radially outside the band 9 in the tread portion 2.

Aside from the positions of the breaker 7 and the band 9, the construction of the motorcycle tire 31 is the same as that of the motorcycle tire 1, therefore, redundant descriptions are omitted.

A method for manufacturing the motorcycle tire 31 (second invention) will be described in detail below.

The raw tire building process in this method includes a raw tire main body building process S2a, a band building process S2b, a breaker building process S2c, and a sticking process S2d.

The raw tire main body building process S2a is substantially the same as the raw tire main body building process S1a.

Figure 8:
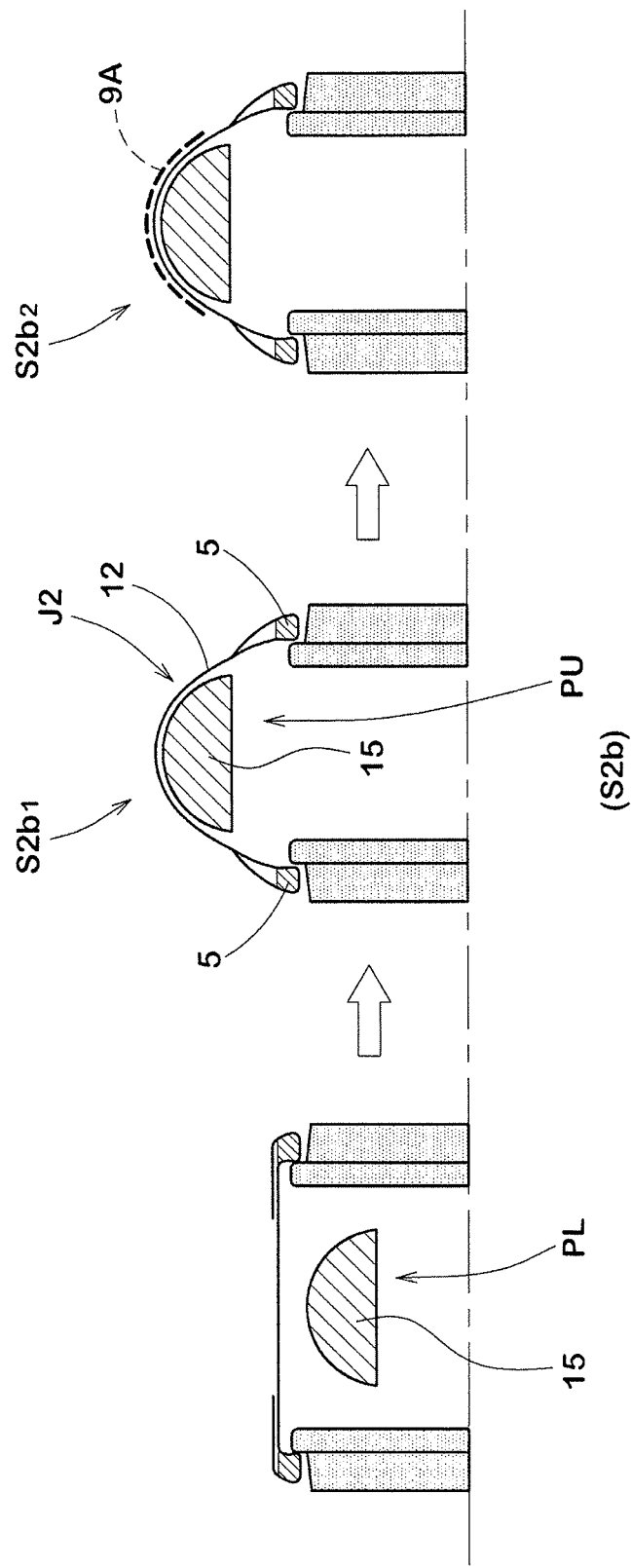
FIG. 8 is a schematic diagram for explaining the band building process in the second invention.

The band building process S2b is, as shown in FIG. 8, to form a band ply 9A on the outer surface of the raw tire main body 12 by spirally winding a tape directly on the outer surface of the raw tire main body 12 which is swollen in a toroidal shape and whose inside is supported by the profiled deck 15.

More specifically, the band building process S2b comprises a second swelling step S2b1 and a tape winding step S2b2.

The second swelling step S2b1 is such that, the profiled deck 15 is expanded from the contracted state to the expanded state as explained above, while decreasing the distance between the bead cores 5, so that the raw tire main body 12 is swollen to the second swollen state 32 in which the inside of the raw tire main body 12 is supported by the profiled outer surface of the profiled deck 15.

The tape winding step S2b2 is such that, under such supported state, the tape is spirally wound on the outer circumferential surface of the raw tire main body 12 so that the band ply 9A is formed directly on the raw tire main body 12 along the outer surface of the profiled deck 15.

Figure 9:
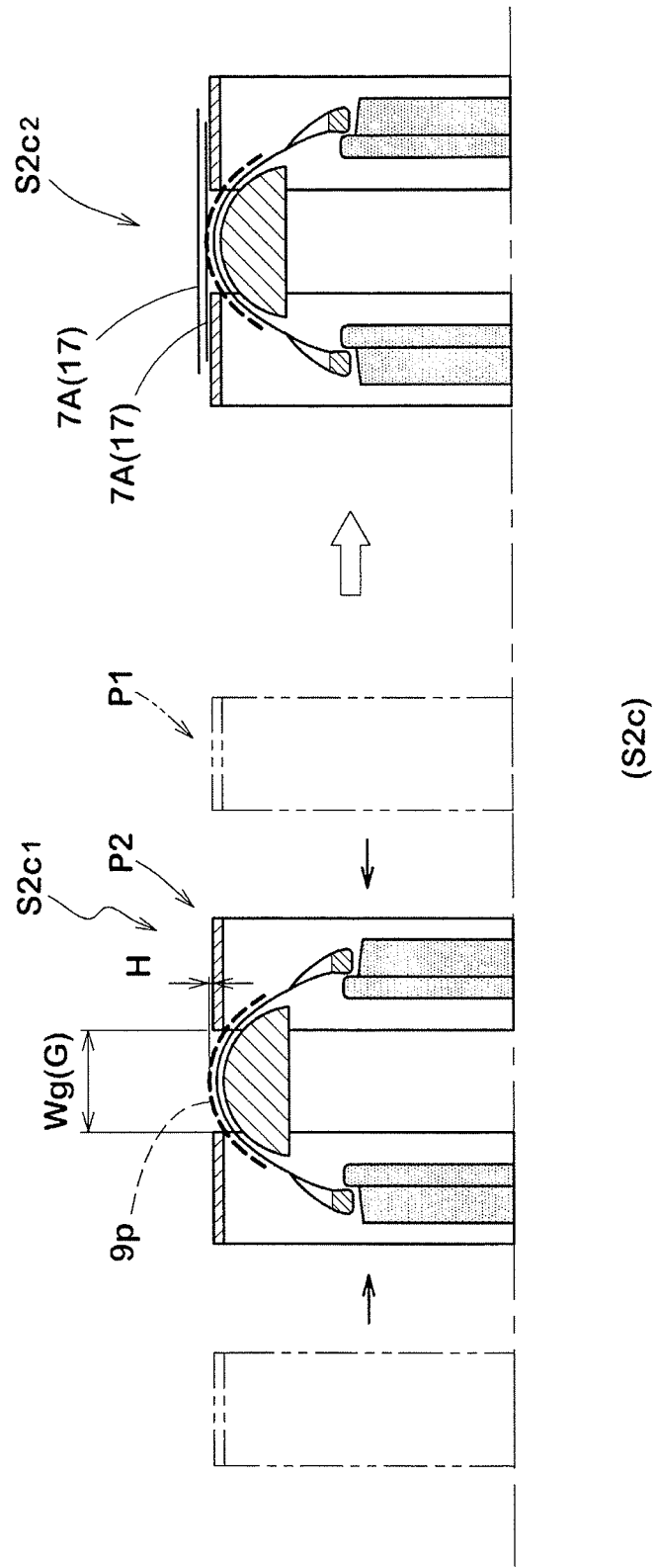
FIG. 9 is a schematic diagram for explaining the breaker building process in the second invention.

The breaker building process S2c comprises a support ring closing step S2c1 and a winding step S2c2 as shown in FIG. 9.

The support ring closing step S2c1 is to move the support rings 14 from their axially outer standby positions P1 to their axially inner operate positions P2.
The crown portion 9p of the band ply 9A on the raw tire main body 12 under the second swollen state 32 slightly protrudes from the outer surfaces of the support rings 14 through the gap G therebetween.
It is preferable that the axial width wg between the support rings 14 at the operate positions P2 is in a range of from about 50 to 100 mm, and
the protruding amount H of the crown portion 9p of the band ply 9A from the outer surfaces of the support rings 14 is in a range of from about 5 to 30 mm for the similar reasons to the first invention.

The winding step S2c2 is such that a strip of the breaker ply 7A is wound on the outer surfaces of the support rings 14 so as to extend across the gap G.
Thereby, a cylindrical breaker ply 17 whose inner surface is adhered to the crown portion of the band ply 9A is formed.

The sticking process s2d comprises a turn-down step S2d1.

Figure 10:
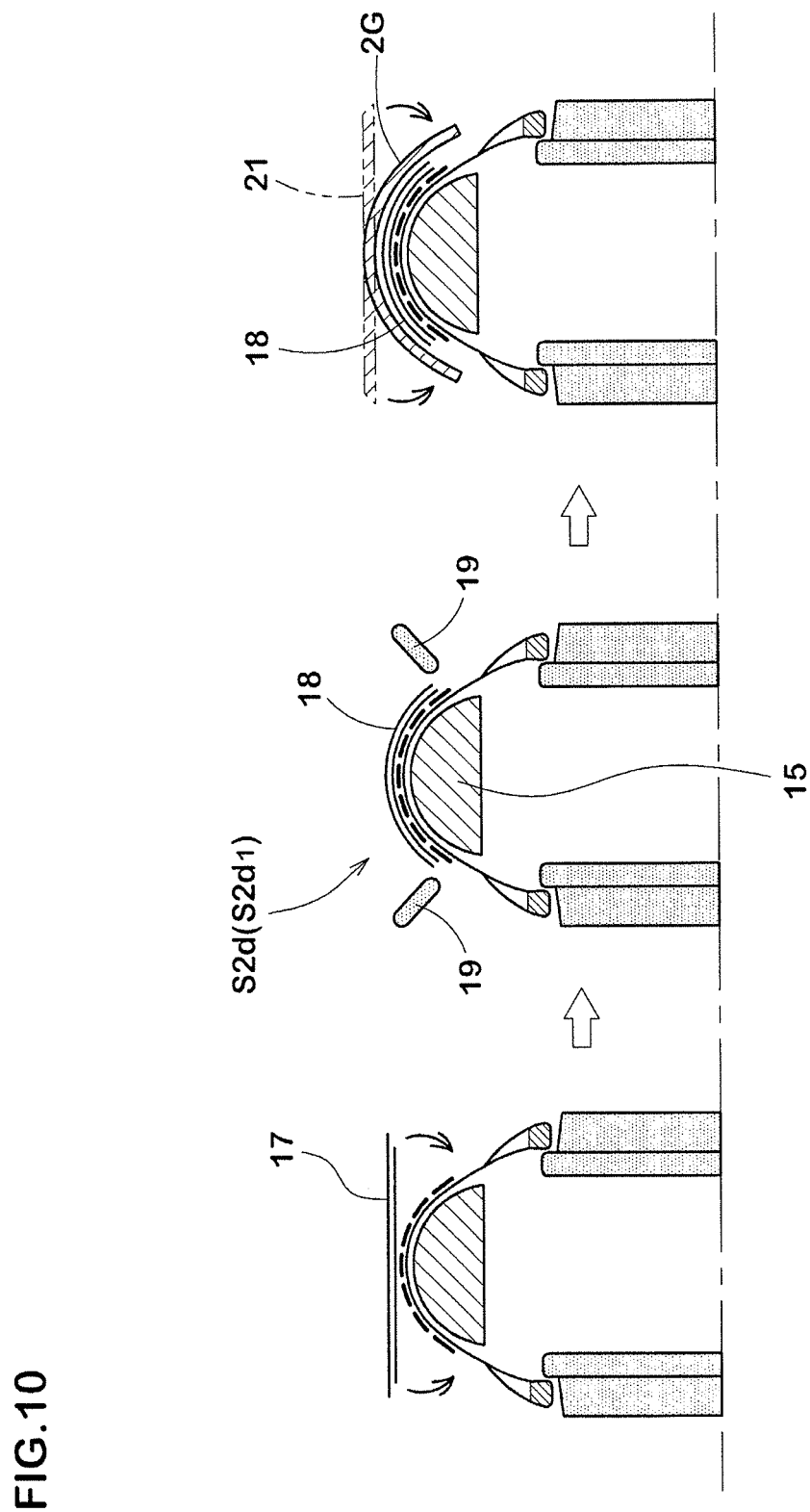
FIG. 10 is a schematic diagram for explaining the sticking process in the second invention.

As shown in FIG. 10, the turn-down step S2d1 is such that, after the support rings 14 are moved to the respective standby positions P1, in such a state that the inside of the assembly is supported by the profiled deck 15, both edge portions of the cylindrical breaker ply 17 are turned down so that the cylindrical breaker ply 17 is shaped into the curved breaker ply 18 curved along the profiled outer surface of the profiled deck 15.

The turn-down operation can be achieved by pressing pressure rollers 19 against the breaker ply 17 while rotating the shaping drum 13 together with the assembly thereon.

In the first invention and second invention, it is preferable that the size of the raw tire relative to the tire vulcanizing mold is such that the stretch of the band ply 9A caused during vulcanization-molding is within a range of from 0.5% to 5.0%.
If less than 0.5% (namely, if the relative size is large), during vulcanization-molding, the raw tire is pressed against the vulcanization mold by a large force, and there is a tendency that a large amount of spew is caused. If more than 5.0% (namely, if the relative size is small), the force for pressing the raw tire against the mold becomes insufficient, and there is a possibility that a lack of rubber occurs in the outer surface of the vulcanized tire.

Comparison Tests

In order to confirm advantageous effects of the first and second inventions, motorcycle tires of size 120/70zR17 having the structures shown in FIG. 1 and FIG. 7 were manufactured according to the method of the first invention and the method of the second invention, respectively, and measured for the uniformity. For comparison, such motorcycle tires were manufactured according to the method shown in FIG. 11 (comparative example Ref. 1) and the method shown in FIG. 12 (comparative example Ref. 2), and measured for the uniformity.

Each of the tires had a carcass composed of a single ply of nylon cords arranged radially at 90 degrees with respect to the tire equator, a breaker composed of two cross plies of parallel aramid cords laid at 27 degrees with respect to the tire equator, and a band composed of a single ply of a spirally wound band cord whose specifications are shown in Table 1.

As to the notations for the manufacturing method in Table 1, "New" means the method of the first invention (including the processes shown in FIGS. 3 to 6) in the case of the FIG. 1 structure. In the case of the FIG. 7 structure, "New" means the method of the second invention (including the processes shown in FIGS. 8 to 10). "A" means the manufacturing method based on FIG. 11. "B" means the manufacturing method based on FIG. 12.

As to the notations for the tread rubber in Table 1, "Ext" means that the tread rubber was formed by extruding a strip of rubber having a width corresponding to that of the tread rubber. "STW" means that the tread rubber was formed by spirally winding a narrow width tape a large number of times on the tread reinforcing cord layer (band/breaker).

(1) Uniformity Test:

For each of the methods, twenty sample tires were measured for the radial run out (RRO) and lateral run out (LRO) at a position Q in the tread shoulder portion as shown in FIG. 1, according to the "Test Procedures for Automobile Tire uniformity" specified in JASO c607:2000, to obtain the average of the twenty measured values. The results are shown in Table 1, wherein the smaller value is better.

(2) Undulation Test:

The raw tire was disassembled, and the ply edge portions of the band and breaker were visually checked along the entire circumference whether undulation occurred or not. The results are shown in Table 1, wherein "A" means that no undulation occurred, "B" means that undulation occurred at less than 5 positions, and "C" means that undulation occurred at more than 4 positions.

(3) Appearance Test:

The appearance of the vulcanized tire was visually inspected. The results are shown in Table 1, wherein "G" means that there was no defective appearance. "B" means that a lack of rubber occurred in the outer surface of the vulcanized tire due to lack of the force to press the raw tire against the mold. "OS" means that a large amount of spew was caused due to excessively large force to press the raw tire against the mold.

As shown in Table 1, the motorcycle tires manufactured according to the present inventions were improved in the uniformity.

TABLE 1

| Method | Ref. 1 A | Ref. 2 B | Ex. 1 New | Ex. 2 New | Ex. 3 New | Ex. 4 New | Ex. 5 New | Ex. 6 New | Ref. 3 A | Ref. 4 B | Ex. 7 New | Ex. 8 New | Ex. 9 New | Ex. 10 New | Ex. 11 New | Ex. 12 New |
|---|---|---|---|---|---|---|---|---|---|---|---|---|---|---|---|---|
| Tire structure (Fig. No.) | 1 | 1 | 1 | 1 | 1 | 1 | 1 | 1 | 7 | 7 | 7 | 7 | 7 | 7 | 7 | 7 |
| Band cord material | nylon | nylon | nylon | nylon | aramid | aramid | nylon | nylon | nylon | nylon | nylon | nylon | aramid | aramid | nylon | nylon |

TABLE 1-continued

| Method | Ref. 1 A | Ref. 2 B | Ex. 1 New | Ex. 2 New | Ex. 3 New | Ex. 4 New | Ex. 5 New | Ex. 6 New | Ref. 3 A | Ref. 4 B | Ex. 7 New | Ex. 8 New | Ex. 9 New | Ex. 10 New | Ex. 11 New | Ex. 12 New |
|---|---|---|---|---|---|---|---|---|---|---|---|---|---|---|---|---|
| Stretch of band (%) | | | | | | | | | | | | | | | | |
| at tire equator | 3.0 | 3.0 | 3.0 | 3.0 | 0.1 | 0.5 | 5.0 | 6.0 | 3.0 | 3.0 | 3.0 | 3.0 | 0.1 | 0.5 | 0.5 | 6.0 |
| at ply edge | −10.0 | 3.0 | 3.0 | 3.0 | 0.1 | 0.5 | 5.0 | 6.0 | −10.0 | 3.0 | 3.0 | 3.0 | 0.1 | 0.5 | 0.5 | 6.0 |
| Tread rubber | Ext | Ext | Ext | STW | STW | STW | STW | STW | Ext | Ext | Ext | STW | STW | STW | STW | STW |
| Uniformity | | | | | | | | | | | | | | | | |
| RRO | 1.6 | 1.5 | 0.6 | 0.3 | 0.3 | 0.4 | 0.3 | 0.4 | 1.6 | 1.5 | 0.6 | 0.3 | 0.3 | 0.4 | 0.3 | 0.4 |
| LRO | 1.4 | 1.6 | 0.7 | 0.2 | 0.3 | 0.4 | 0.3 | 0.3 | 1.4 | 1.6 | 0.7 | 0.2 | 0.3 | 0.4 | 0.3 | 0.3 |
| Undulation | C | C | A | A | A | A | A | A | C | C | A | A | A | A | A | A |
| Appearance | G | G | G | G | OS | G | G | B | G | G | G | G | OS | G | G | B |

The invention claimed is:

1. A method for manufacturing a motorcycle tire,
the motorcycle tire comprising
a tread portion,
a pair of sidewall portions,
a pair of bead portions each with a bead core therein,
a carcass extending between the bead portions through the tread portion and the sidewall portions,
a band disposed radially outside the carcass in the tread portion and composed of at least one ply of at least one cord wound spirally and circumferentially around the tire, and
a breaker disposed radially outside the band in the tread portion and composed of two or three plies of cords laid at angles of from 10 to 40 degrees with respect to the tire circumferential direction,
wherein
in a cross section of the tire, the tread portion is convexly curved so that a tread face between tread edges is curved in an arc swelling radially outwardly,
in the tread portion, the carcass is curved along the tread face in an arc swelling radially outwardly, and
the inner surface of the tire in the tread portion is curved along the tread face in an arc swelling radially outwardly,
the method comprising:
a raw tire main body building process for building a cylindrical raw tire main body comprising the carcass formed by winding a strip of carcass ply material into a cylindrical shape, and the bead cores disposed in both end portions of the carcass,
a band building process for building said at least one ply of the band by spirally circumferentially winding a tape for forming said at least one ply on the raw tire main body swollen into a toroidal shape by the use of a profiled deck,
a breaker building process for building each of the two or three breaker plies by winding a strip of breaker ply material into a cylindrical shape to form the breaker in a cylindrical shape,
a sticking process for applying both edge portions of the cylindrical breaker to the band on the swollen raw tire main body by turning down the edge portions,
wherein the profiled deck has an outer surface having a profile curved in an arc which is the substantially same as that of the inner surface of the tire in the tread portion, and expandable from a contracted state thereof to an expanded state thereof,
wherein the band building process comprises
a swelling step in which the profiled deck is expanded from its contracted state to its expanded state while decreasing the distance in the tire axial direction between the bead cores, so that the raw tire main body is swollen into a swollen state, in which the inner surface of the tire in the tread portion is supported by the profiled deck, and
a tape winding step in which, in the swollen state of the raw tire main body supported by the profiled deck, the tape is spirally wound on the outer circumferential surface of the curved carcass of the swollen raw tire main body so that said at least one ply of the band is formed along said outer surface of the profiled deck via the carcass,
wherein the breaker building process comprises
a support ring closing step in which a pair of support rings each having a cylindrical outer surface are moved from axially outer respective standby positions thereof to axially inner respective operating positions thereof so that the crown portion of the band slightly protrudes from the cylindrical outer surfaces of the support rings through a gap therebetween, wherein the support rings are disposed one on each side of an axial center corresponding to the tire equatorial plane, and supported movably in the axial direction so as to come close to each other or move away from each other, and
a winding step in which the strip of the breaker ply material is wound on the support rings so as to extend across the gap, whereby the cylindrical breaker whose inner circumferential surface is adhered to the protruding crown portion of the band is formed, and
wherein the sticking process comprises
a turn-down step in which, after the support rings are moved to the standby positions, both edge portions of the cylindrical breaker are turned down in the swollen state of the raw tire main body supported by the profiled deck so as to shape the cylindrical breaker into the curved breaker curved along the outer surface of the profiled deck, and
wherein in the support ring closing step, a maximum protruding amount (H) of the crown portion of the band from the cylindrical outer surfaces of the support rings is in a range from 5 to 30 mm in the radial direction.

2. The method for manufacturing a motorcycle tire according to claim 1, wherein a stretch in the tire circumferential direction of said at least one ply of the band during vulcanizing the raw tire is in a range of from 0.5% to 5.0%.

3. The method for manufacturing a motorcycle tire according to claim 2, wherein in the support ring closing step, the gap between the support rings is set in a range of 50 to 100 mm.

4. The method for manufacturing a motorcycle tire according to claim 1, wherein in the support ring closing step, the gap between the support rings is set in a range of 50 to 100 mm.

5. The method for manufacturing a motorcycle tire according to claim 1, which further comprises a tread building process for building the tread portion by circumferentially winding a strip of a tread rubber member on the curved breaker into a cylindrical shape, and then turning down both edge portions thereof onto the breaker.

6. The method for manufacturing a motorcycle tire according to claim 1, wherein the carcass is composed of only one ply of carcass cords arranged radially at an angle of from 65 to 90 degrees with respect to the tire circumferential direction, extending between the bead portions through the tread portion and the sidewall portions and turned up around the bead core in each bead portion from the axially inside to the axially outside of the tire so as to form a pair of turned up portions and a main portion therebetween.

7. The method for manufacturing a motorcycle tire according to claim 1, wherein the breaker comprises two plies of breaker cords laid parallel each other at an angle of from 10 to 40 degrees with respect to the tire circumferential direction.

8. The method for manufacturing a motorcycle tire according to claim 1, wherein the band is composed of only one ply of at least one spirally-wound band cord.

9. The method for manufacturing a motorcycle tire according to claim 1, wherein the carcass is composed of only one ply of carcass cords arranged radially at an angle of from 65 to 90 degrees with respect to the tire circumferential direction, extending between the bead portions through the tread portion and the sidewall portions and turned up around the bead core in each bead portion from the axially inside to the axially outside of the tire so as to form a pair of turned up portions and a main portion therebetween, the breaker comprises two plies of breaker cords laid parallel each other at an angle of from 10 to 40 degrees with respect to the tire circumferential direction, and the band is composed of only one ply of at least one spirally-wound band cord.

\* \* \* \* \*